(12) United States Patent
Chambriard et al.

(10) Patent No.: US 10,220,654 B2
(45) Date of Patent: Mar. 5, 2019

(54) CROWN FOR AN AIRCRAFT TIRE

(71) Applicants: COMPAGNIE GENERALE DES ETABLISSEMENTS MICHELIN, Clermont-Ferrand (FR); MICHELIN RECHERCHE ET TECHNIQUE S.A., Granges-Paccot (CH)

(72) Inventors: Francois Chambriard, Clermont-Ferrand (FR); Gilles Roche, Clermont-Ferrand (FR)

(73) Assignees: Compagnie Generale Des Etablissements Michelin, Clermont-Ferrand (FR); Michelin Recherche Et Technique, S.A., Granges-Paccot (CH)

( * ) Notice: Subject to any disclaimer, the term of this patent is extended or adjusted under 35 U.S.C. 154(b) by 521 days.

(21) Appl. No.: 14/365,543

(22) PCT Filed: Dec. 18, 2012

(86) PCT No.: PCT/EP2012/075938
§ 371 (c)(1),
(2) Date: Jun. 13, 2014

(87) PCT Pub. No.: WO2013/092578
PCT Pub. Date: Jun. 27, 2013

(65) Prior Publication Data
US 2014/0367012 A1    Dec. 18, 2014

(30) Foreign Application Priority Data
Dec. 20, 2011    (FR) ...................................... 11 62025

(51) Int. Cl.
*B60C 9/20* (2006.01)
*B60C 9/18* (2006.01)
*B60C 9/00* (2006.01)

(52) U.S. Cl.
CPC .............. *B60C 9/20* (2013.01); *B60C 9/0042* (2013.01); *B60C 9/18* (2013.01); *B60C 9/2003* (2013.01);
(Continued)

(58) Field of Classification Search
CPC .............. B60C 9/20; B60C 2009/2019; B60C 2009/2041
See application file for complete search history.

(56) References Cited

U.S. PATENT DOCUMENTS

| 4,244,415 A * | 1/1981 | Peter ......................... B60C 9/20 |
| | | 152/209.26 |
| 4,603,721 A | 8/1986 | Kogure et al. |

(Continued)

FOREIGN PATENT DOCUMENTS

| EP | 0174147 A2 | 3/1986 |
| EP | 0414470 A2 | 2/1991 |

(Continued)

OTHER PUBLICATIONS

Machine translation for Japan 2006-199073 (no date).*
(Continued)

*Primary Examiner* — Steven D Maki
(74) *Attorney, Agent, or Firm* — Dickinson Wright PLLC

(57) ABSTRACT

A tire for an aeroplane and, in particular, to the crown of a tire for an aeroplane, having reduced dimensions and mass of the pieces of tread in the event of accidental tire tread separation, without the use of additional devices external to the tire and therefore without penalizing the payload of the aeroplane, including a tread intended to come into contact with the ground via a tread surface and comprised radially between a bottom surface and the tread surface, the tread comprising at least two circumferential ribs adjacent to at least one circumferential groove, each circumferential rib extending radially between the bottom surface and the tread surface and axially between two edge corners in the tread surface, and a crown reinforcement radially on the inside of the bottom surface, wherein a tread separation layer is arranged radially on the inside of at least one circumferential rib between the bottom surface and the crown reinforcement, (Continued)

axially between the two edge corners of the said circumferential rib, in the tread surface, and circumferentially over at least part of the circumference of the tire, and the radial distance ($d_1$) between the tread separation layer and the bottom surface is at most equal to 1 mm.

6 Claims, 3 Drawing Sheets

(52) U.S. Cl.
CPC .............. *B60C 2009/2016* (2013.01); *B60C 2009/2019* (2013.01); *B60C 2009/2041* (2013.01); *B60C 2200/02* (2013.01)

(56) References Cited

U.S. PATENT DOCUMENTS

| | | | |
|---|---|---|---|
| 4,947,914 A | 8/1990 | Noma et al. | |
| 5,228,933 A * | 7/1993 | Kawabata | B60C 9/20 |
| | | | 152/209.5 |
| 5,593,521 A * | 1/1997 | Iseki | B60C 9/20 |
| | | | 152/209.28 |
| 6,374,883 B1 * | 4/2002 | Wilson | B60C 11/0306 |
| | | | 152/209.26 |
| 2011/0180189 A1 | 7/2011 | Nakano | |

FOREIGN PATENT DOCUMENTS

| | | |
|---|---|---|
| EP | 0442678 A2 | 8/1991 |
| EP | 2127907 A1 | 12/2009 |
| JP | 63-149205 A * | 6/1988 |
| JP | 03-016805 A * | 1/1991 |
| JP | 07-069005 A * | 3/1995 |
| JP | 2006-199073 A * | 8/2006 |
| JP | 2010-047103 | 3/2010 |
| JP | 2010-047103 A * | 3/2010 |

OTHER PUBLICATIONS

Machine translation for Japan 63-149205 (no date).*
Machine translation for Japan 07-069005 (no date).*
Machine translation for Japan 03-016805 (no date).*
PCT/EP2012/075938, International Search Report (ISR), Form PCT/ISA/210, dated Feb. 13, 2013 (including English translation), 7 pgs.

* cited by examiner

CROWN FOR AN AIRCRAFT TIRE

This application is a 371 national phase entry of PCT/EP2012/075938, filed 18 Dec. 2012, which claims benefit of FR 1162025, filed 20 Dec. 2011, the entire contents of which are incorporated herein by reference for all purposes.

BACKGROUND

1. Field

The present disclosure relates to a tire for an aeroplane and, in particular, to the crown of an aeroplane tire.

2. Description of Related Art

Aeroplane manufacturers are constantly concerned with passenger safety and, therefore, with reducing the risks of failure of their craft. Of the failure modes considered, the partial or complete loss of the tread of a tire with which an aircraft landing gear is equipped, is a critical failure mode that occurs during aeroplane take off or landing phases.

This failure mode occurs, in particular, when the tire runs over a blunt object that might by chance be present on the runway. Bearing in mind the harsh conditions of use of an aeroplane tire, which are characterized by a high inflation pressure and a high static loading and a high speed, the tread of the tire running over the blunt object causes damage to the tread which generally results in the cutting of the tread and then in pieces of tread of varying geometric dimensions and mass being thrown out.

The pieces of tread may then either strike the structures of the aeroplane and lead to significant structural damage, because of the mechanical energy stored up by the said pieces, the higher the mass and speed at which the pieces are thrown up, the higher this mechanical energy is, or may enter the aeroplane engines and lead to problems with the operation of the said engines, if these engines are unable to absorb the pieces of tread because they are too great in size.

Reinforcing the structures of the aeroplane in order to withstand potential impacts, particularly those of pieces of tread, has been considered. However, for the same materials, this solution entails increasing the mass of the structure, something which is penalizing as far as aeroplane performance is concerned, which is why increasingly lightweight structural materials are being used. Mechanically strengthening the structure does not, however, solve the problem of pieces being thrown into the engines.

Devices affording protection against pieces of tread being thrown up have also been considered. Document WO 2010012913 describes a protective panel, the external surface of which comprises a composite material, and mounted, via deformable components, on a support connected to the structure of the aeroplane. The deformable components, fixed to several support stiffening components and perpendicular to the external surface of the protective panel, are designed to buckle under the effect of impact by thrown-up pieces of tread. Document WO 2010052447 describes a device that protects the engines of an aeroplane from thrown-up tire tread debris. This device comprises a protective bar connected in a pivoting manner to the aeroplane main landing gear, the protective bar being able to move between a first and a second position. In the first position, the protective bar extends laterally across the mounted assembly, consisting of the tire and of a wheel, to intercept possible paths of tread debris.

Another family of solutions describes devices that break up the tread with a view to minimizing the size of the pieces of tread and therefore minimizing impacts with the aeroplane. Document U.S. Pat. No. 7,669,798 describes break-up means situated between the wheel and another part of the aeroplane and able to break-up into several pieces the bit of tread which has become detached from the tire and is being thrown up towards the other part of the aeroplane. These break-up means, such as a grating with blades able to cut up the material of the tread, are designed to disperse the said pieces.

The aforementioned protective or break-up devices have the disadvantage of constituting additional structures, the additional masses of which are penalizing to the payload of the aeroplane.

SUMMARY

The inventors have therefore set themselves the objective of reducing the dimensions and therefore the mass of the pieces of tread in the event of accidental tread separation, without the use of additional devices external to the tire and therefore without penalizing the payload of the aeroplane.

This objective has been achieved, according to embodiments of the invention, by a tire for an aeroplane comprising:

a tread intended to come into contact with the ground via
  a tread surface and comprised radially between a bottom surface and the tread surface,
 the tread comprising at least two circumferential ribs
  adjacent to at least one circumferential groove,
 each circumferential rib extending radially between the
  bottom surface and the tread surface and axially
  between two edge corners in the tread surface,
 a crown reinforcement radially on the inside of the bottom
  surface, a tread separation layer being arranged:
 radially on the inside of at least one circumferential rib
  between the bottom surface and the crown reinforcement,
 axially between the two edge corners of the said circumferential rib, in the tread surface,
 and circumferentially over at least part of the circumference of the tire, and the radial distance between the tread separation layer and the bottom surface being at most equal to 1 mm.

As a tire has a geometry of revolution about an axis of rotation, the geometry of the tire is generally described in a meridian plane containing the axis of rotation of the tire. For a given meridian plane, the radial, axial and circumferential directions respectively denote the directions perpendicular to the axis of rotation of the tire, parallel to the axis of rotation of the tire and perpendicular to the meridian plane. The plane perpendicular to the axis of rotation of the tire and passing through the middle of the tread surface of the tire is referred to as the equatorial plane.

In what follows, the expressions "radially", "axially" and "circumferentially" respectively mean "in the radial direction", "in the axial direction" and "in the circumferential direction". The expressions "radially on the inside, or respectively radially on the outside" mean "closer or, respectively, further away, from the axis of rotation of the tire, in the radial direction, than". The expressions "axially on the inside or respectively axially on the outside" mean "closer or, respectively further away, from the equatorial plane, in the axial direction, than". The respective dimensions of a given element in radial, axial and circumferential directions will also be denoted the "radial thickness or height", "axial width" and "circumferential length" of this element.

In general, a tire comprises a crown comprising a tread intended to come into contact with the ground via a tread surface, the said crown being connected by two sidewalls to two beads intended to come into contact with a rim.

The tread is a torus-shaped volume comprised radially between a radially inner bottom surface and a radially outer tread surface: this is the wearing part of the tire.

The bottom surface is a theoretical surface delimiting the maximum permissible degree of wear: when the level of wear reaches this bottom surface, the tire is withdrawn from service.

The tread surface is intended to come into contact with the ground. By convention, the axial width of the tread surface is defined as being the axial distance between the axial limits of contact of the tread surface, when the tire in the new condition is subjected to a radial deflection equal to 32%, under the combined action of the vertical load and the inflation pressure. By definition, the radial deflection of a tire is its radial deformation, or relative variation in radial height, when the tire passes from an unladen inflated state to a statically loaded inflated state. It is defined by the ratio of the variation in radial height of the tire to half the difference between the outside diameter of the tire and the maximum diameter of the rim measured on the rim flange. The outside diameter of the tire is measured under static conditions in an unladen state inflated to the nominal pressure as recommended, for example, by the Tire and Rim Association or TRA.

The tread is generally made up of raised elements extending radially outwards from the bottom surface, the said raised elements being separated by voids. In the case of an aeroplane tire, the raised elements are usually circumferential ribs separated by circumferential voids referred to as circumferential grooves. A circumferential rib is characterized by its radial height, between the bottom surface and the tread surface, and by its axial width, the distance between the axial ends of its area for contact with the ground. By way of example, a tread of an aeroplane tire may comprise, symmetrically about the equatorial plane, two axially outermost ribs called the shoulder ribs, limited axially on the outside by the edges of the tread and on the inside by a circumferential groove, two intermediate ribs and, in the middle of the tread, a central rib.

The crown reinforcement is the reinforcing structure of the tire radially on the inside of the tread and usually radially on the outside of the radial carcass reinforcement. The crown reinforcement of an aeroplane tire generally comprises at least one crown reinforcing layer referred to as the crown layer. Each crown layer is made up of reinforcing elements coated in an elastomeric material, i.e. one based on natural or synthetic rubber, the said mutually parallel reinforcing elements making an angle of between +20° and −20° with the circumferential direction. In an aeroplane tire, the reinforcing elements of a crown layer are generally arranged circumferentially in an undulating curve.

Among the crown layers a distinction is made between the working layers that constitute the working reinforcement, usually made up of textile reinforcing elements, and the protective layers constituting the protective reinforcement, made up of metal or textile reinforcing elements and arranged radially on the outside of the working reinforcement. The working layers govern the mechanical behaviour of the crown. The protective layers essentially protect the working layers from attack likely to spread through the tread radially towards the inside of the tire. A crown layer, particularly a working layer, is often an axially wide layer, i.e. one that has an axial width, for example, at least equal to two-thirds of the maximum axial width of the tire. The maximum axial width of the tire is measured at the sidewalls, the tire being mounted on its rim and lightly inflated, i.e. inflated to a pressure equal to 10% of the nominal pressure.

The reinforcing elements of the carcass and working layers, for aeroplane tires, are usually cords made up of spun textile filaments, preferably made of aliphatic polyamides or of aromatic polyamides. The reinforcing elements of the protective layers may be either cords made up of metal threads or cords made up of spun textile filaments.

The extension mechanical properties of the textile reinforcing elements, such as the modulus, the elongation and the force at break, are measured following prior conditioning. "Prior conditioning" means the storage of the textile reinforcing elements for at least 24 hours, prior to measurement, in a standard atmosphere in accordance with European Standard DIN EN 20139 (temperature of 20±2° C.; relative humidity of 65±2%). The measurements are taken in the known way using a ZWICK GmbH & Co (Germany) tensile test machine of type 1435 or type 1445. The textile reinforcing elements then undergo tension over an initial length of 400 mm at a nominal rate of 200 mm/min. All the results are averaged over 10 measurements.

According to embodiments of the invention, a tread separation layer is positioned radially on the inside of at least one circumferential rib between the bottom surface and the crown reinforcement, axially between the two edge corners of the said circumferential rib in the tread surface and circumferentially over at least part of the circumference of the tire.

A tread separation layer is understood to mean a means which makes it possible to calibrate the maximum size of the pieces of tread upon accidental tire tread separation i.e. in the event of accidental loss of the tread, also known as the cap. This tread separation layer is usually, although not exclusively, a material containing mutually parallel reinforcing elements.

When an aeroplane tire, during the take off or landing phase, runs over a blunt object, this object may cut the tread and start a cracking over a certain radial thickness. As this crack enters the contact patch in which the tread surface is in contact with the ground, under the action of cyclic mechanical stresses with each revolution of the wheel, this crack spreads radially towards the inside of the tire as far as the radially outermost crown layer, then spreads axially and circumferentially along the radially outer face of the radially outermost crown layer, causing the crown of the tire to be cut at the radially outermost crown layer. Under the effect of mechanical stresses and, in particular, centrifugal forces, the crack will then spread radially towards the outside of the tire through the tread, at various azimuths of the tire. As a result, the portion of tread thus cut out in the form of pieces of varying dimensions, or even practically the entire tread, will detach from the tire and be thrown outwards with the risk of striking the structure of the aeroplane or of entering the engines.

In a conventional crown design, the pieces of tread obtained after tread separation have a maximum radial thickness corresponding to the radial distance between the tread surface and the radially outer face of the radially outer crown layer. The pieces of tread may extend axially over part or all of the axial width of the tread. Circumferentially, the pieces of tread may extend over a large proportion of the periphery of the tire, or even over the entire periphery thereof.

A tread separation layer according to embodiments of the invention makes it possible to limit the dimensions of the pieces of tread after tread separation, i.e. the radial thickness, axial width and circumferential length thereof.

Because the tread separation layer is arranged radially on the inside of at least one circumferential rib between the bottom surface and the crown reinforcement, the crack initiated by a blunt object will spread radially inwards as far as the tread separation layer before progressing axially and circumferentially. In other words, the crack will spread less deeply by virtue of this tread separation layer which impedes its radial spread. Because the tread separation layer is radially on the outside of the crown reinforcement, the maximum radial thickness of a piece of tread is less than that obtained in the absence of a tread separation layer. Moreover, being radially on the inside of the bottom surface guarantees that the tread separation layer will not appear as the circumferential rib wears down and thus limit the wearing life of the tire.

Moreover, the tread separation layer is positioned axially between the two edge corners of the said circumferential rib in the tread surface. In other words, each circumferential rib has its own individual tread separation layer, which does not extend axially beyond the edge corners of the said circumferential rib in the tread surface. This means that there is a discontinuity between the respective tread separation layers of the circumferential ribs that make up the tread. As a result, the tread separation layer is not a single means common to all of the circumferential ribs. This makes it possible to prevent the crack from spreading axially from one circumferential rib to another. Thus, if just one rib is damaged by a blunt object, that rib ought to be the only victim of cracking. In other words, only the circumferential rib concerned would be made to detach from the tire.

Finally, the tread separation layer is arranged circumferentially over at least part of the circumference of the tire. In general, although not necessarily, the tread separation layer will be continuous over the entire circumference of the tire. It could, if appropriate, be distributed over angular sectors that are to be optimized.

The inventors have been able to note that the presence of the tread separation layer made it possible to reduce the circumferential length of the pieces of tread. They interpreted this fact as being the result of cyclic flexing of the tread separation layer, about the axial direction, at certain circumferentially distributed points of the tread separation layer. In other words, the tread separation layer is, along its circumference, subjected to hinge effects which may culminate in localized breakage of the tread separation layer.

It is important to note that the material of the tread separation layer has been chosen so that it does not make any mechanical contribution to the operation of the crown. Its presence does not alter the mechanical operation of the crown.

Still according to embodiments of the invention, the radial distance between the tread separation layer and the bottom surface is at most equal to 1 mm. This maximum distance guarantees that the tread separation layer is below the maximum wear level of the tread and that it will not appear as the circumferential rib wears down. At the same time it guarantees a minimum radial thickness of the pieces of tread likely to become detached.

Advantageously, the radial distance between the tread separation layer and the crown reinforcement is at least equal to 2 mm. Aside from the fact of guaranteeing a minimum radial thickness of the pieces of tread, it protects the crown reinforcement by preventing the crack from spreading as far as the crown reinforcement. This positioning also avoids any mechanical coupling with the crown reinforcement likely to alter the mechanical operation of the crown of the tire.

It is also advantageous for the axial distance between each axial end of the tread separation layer and the edge corner of the circumferential rib that is closest to be at least equal to 3 mm. This feature makes it possible to protect the axial ends of the tread separation layer from any external attack during the life of the circumferential rib. Moreover, it makes it possible to reduce the risk of having an axial end of the tread separation layer opening into a circumferential groove, taking manufacturing tolerances into consideration. Indeed, that might be likely to cause cracks to start at the base of the circumferential rib, and, as a result, threaten the integrity of the circumferential rib.

Advantageously, the tread separation layer extends circumferentially over the entire circumference of the tire, which means that it is always possible to have the tread separation layer present plumb with any crack likely to spread radially inwards. Damage to the tread can in fact occur at any arbitrary point on the circumference of the tire.

One preferred embodiment of the invention is to have the tread separation layer made up of a material comprising mutually parallel reinforcing elements. This is in fact the simplest technical solution in the case of an aeroplane tire. This is because the matter is then one of positioning a layer of reinforcing elements radially on the outside of the crown reinforcement and locally under each circumferential rib. The choice of the nature of reinforcing elements is governed by the intended mechanical characteristics.

A first alternative form of the preferred embodiment is characterized in that the angle formed by the reinforcing elements of the tread separation layer with the circumferential direction of the tire is at least equal to 30°. This range of inclination of the mechanical reinforcing elements has two technical effects. Firstly, it limits the contribution made by the tread separation layer to the circumferential rigidity of the crown and avoids significant hooping of the crown. Moreover, as the reinforcing elements are relatively inclined with respect to the circumferential direction, their lengths are relatively limited. As the cracks have a tendency to prefer to spread along the reinforcing elements, the cracking distance is thus relatively limited, and this limits the circumferential length of the pieces of tread.

More advantageously still, the angle formed by the reinforcing elements of the tread separation layer with the circumferential direction of the tire is at least equal to 45°. The aforementioned technical effects are even more pronounced in this case.

Another alternative form of the preferred embodiment of the invention is to have the reinforcing elements of the tread separation layer made up of at least one textile material. Textile materials have the advantage of having not too high a force at break, with respect to metallic materials: this encourages easy breakage of the said reinforcing elements in the aforementioned tread separation process. Their elastic modulus is also low enough that it minimizes the mechanical contribution made by the tread separation layer to the mechanical operation of the crown.

The reinforcing elements of the tread separation layer are advantageously made up of at least one aliphatic polyamide, the mechanical properties of which are particularly well suited to the desired effects: ease of breakage of the reinforcing elements and low contribution to crown rigidity.

One particularly advantageous alternative form is to have the reinforcing elements of the tread separation layer made up of nylon, a material that is commonly used in aeroplane tires for the reinforcing elements of the carcass or crown layers.

BRIEF DESCRIPTION OF DRAWINGS

The features and other advantages of embodiments of the invention will be better understood with the aid of FIGS. 1 to 4.

Figure 1:
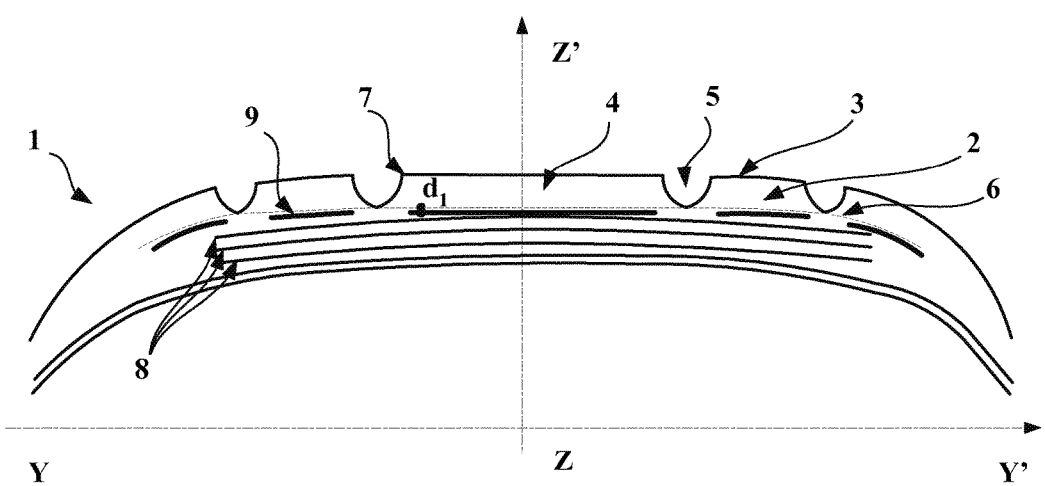
FIG. 1: a meridian section through the crown of a tire according to embodiments of the invention.
Figure 2:
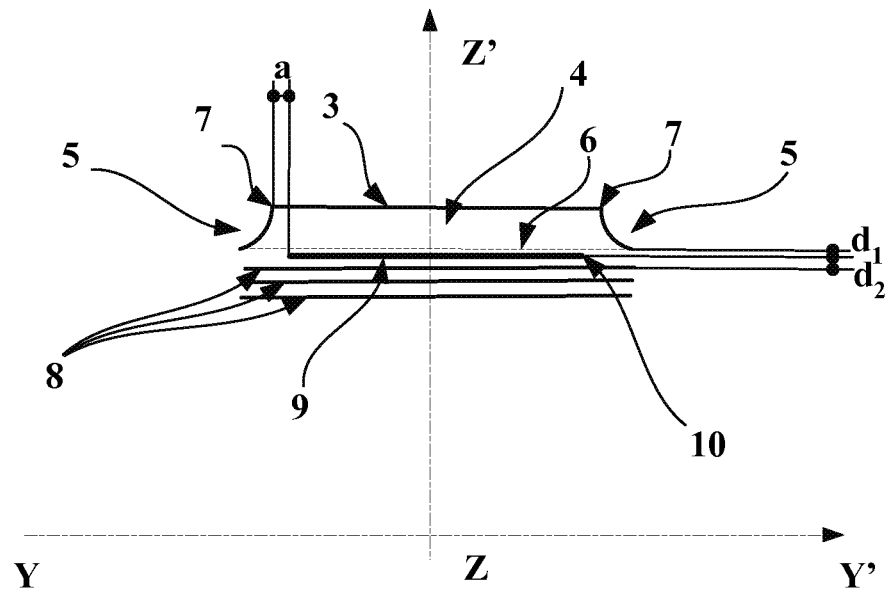
FIG. 2: a meridian section through a portion of a crown of a tire, in the region of a circumferential rib.
Figure 3:
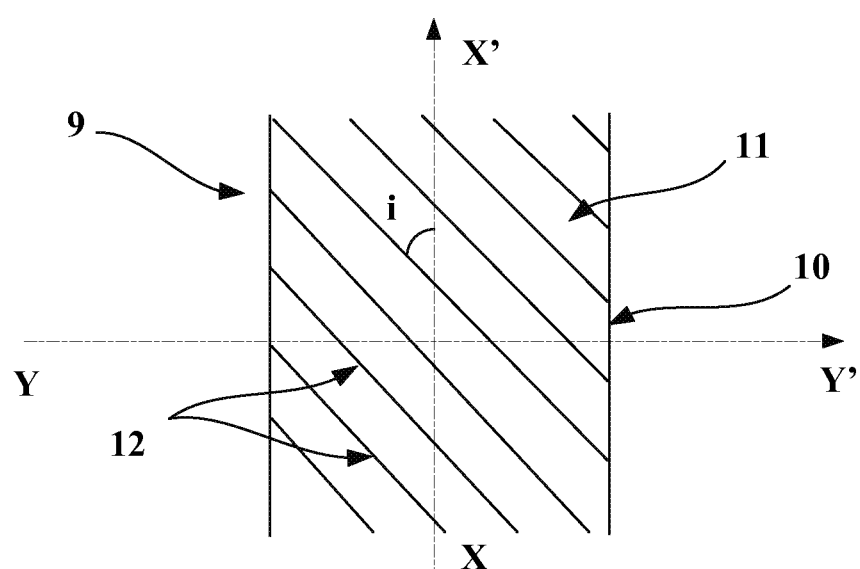
FIG. 3: a plan view of a tread separation layer, in the region of a circumferential rib.

In order to make the invention easier to understand, FIGS. 1 to 3 have not been drawn to scale and are simplified depictions.

DETAILED DESCRIPTION OF SPECIFIC EMBODIMENTS

FIG. 1 shows a meridian section through the crown of the tire 1, namely a section in a meridian plane (YY', ZZ'), in which the directions YY' and ZZ' are the axial and radial directions respectively. The direction XX' (not indicated) is the circumferential direction. The plane (XX', ZZ') is the equatorial plane.

FIG. 1 shows a tire 1 for an aeroplane comprising a tread 2 intended to come into contact with the ground via a tread surface 3 and comprised radially between a bottom surface 6 and the tread surface 3. The tread 2 comprises at least five circumferential ribs 4, in this instance, adjacent to at least one circumferential groove 5. Each circumferential rib 4 extends radially between the bottom surface 6 and the tread surface 3 and axially between two edge corners 7 in the tread surface 3. The axially outermost shoulder circumferential ribs are bounded axially on the inside by an edge corner and axially on the outside by the axial limit of the ground contact area of the tread surface, defined by convention for a new tire subjected to a radial deflection of 32%. The tire 1 also comprises a crown reinforcement 8, made up of crown layers, radially on the inside of the bottom surface 6.

A tread separation layer 9 according to the invention is arranged radially on the inside of each circumferential rib 4 between the bottom surface 6 and the crown reinforcement 8, axially between the two edge corners 7 of the said circumferential rib 4, in the tread surface 3, and circumferentially over the entire circumference (not depicted) of the tire 1. The tread separation layer 9 is positioned radially at the distance $d_1$ from the bottom surface 6.

FIG. 2 shows a meridian section through a circumferential rib 4, extending radially between the bottom surface 6 and the tread surface 3 and axially between two edge corners 7 positioned in the tread surface 3. The circumferential rib 4 is adjacent to two circumferential grooves 5. A tread separation layer 9 is positioned radially on the outside of the radially outer crown layer of the crown reinforcement 8 and radially on the inside of the bottom surface 6. The tread separation layer 9 is positioned at the radial distance $d_1$ from the bottom surface 6 and at the radial distance $d_2$ from the crown reinforcement 8. Each axial end 10 of the tread separation layer 9 is positioned at the axial distance a from the nearest edge corner 7 of the circumferential rib 4.

FIG. 3 is a plan view of a tread separation layer 9 made up of a material 11, comprising mutually parallel reinforcing elements 12. The reinforcing elements 12 of the tread separation layer 9 form, with the circumferential direction XX', an angle i.

Figure 4:
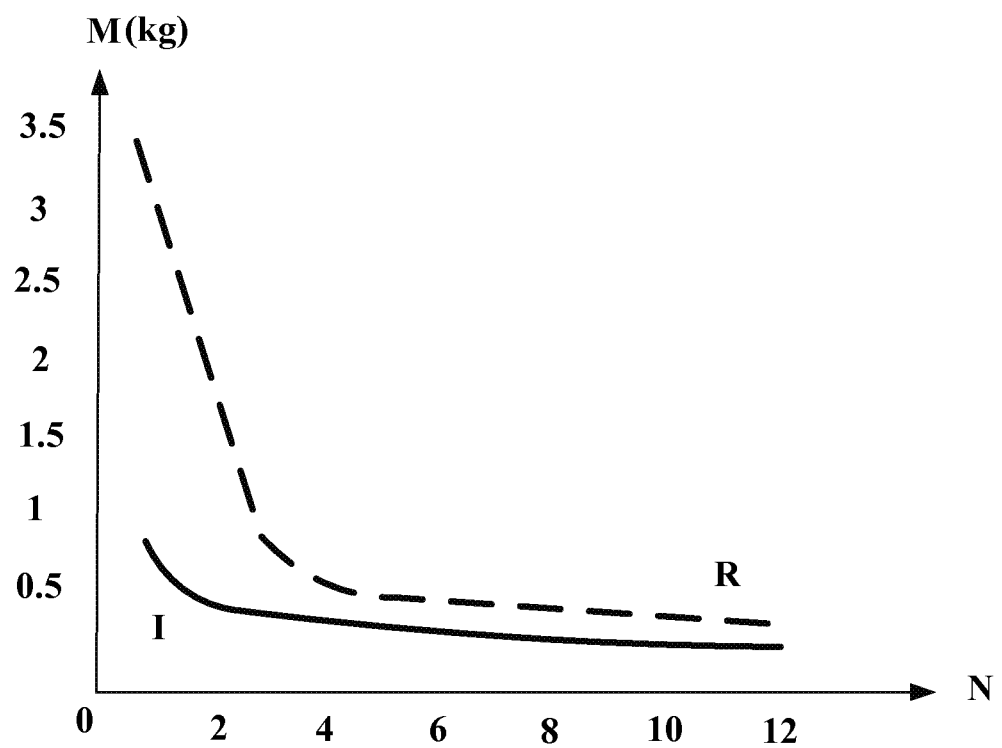
FIG. 4: a graph showing the masses of the pieces of tread as a function of the number of pieces of tread.

The graph that is FIG. 4 shows the distribution of the masses of the pieces of tread, obtained following tread separation resulting from damage to the tread from a blunt object, as a function of the number of pieces. The distribution R for the reference design with no tread separation layer and the distribution I for a design according to the invention with a tread separation layer are indicated.

The inventors have carried out the invention according to the preferred embodiment with a tread separation layer radially on the inside of each circumferential rib and distributed over the entire circumference of the tire for an areoplane tire of size 46×17R20, use of which is characterized by a nominal pressure of 15.9 bars, a nominal static load of 20473 daN and a reference speed of 225 km/h.

In the tire studied, the crown reinforcement comprises 7 working layers, comprising reinforcing elements made of hybrid material combining an aliphatic polyamide of the aramid type and an aromatic polyamide of the nylon type, the said reinforcing elements making a variable angle of between 0° and 12° with the circumferential direction. The crown reinforcement comprises radially, on the outside of the working layers, a protective layer comprising substantially circumferential metal reinforcing elements. The respective tread separation layers of the shoulder, intermediate and central circumferential ribs have respective axial widths of 34 mm, 34 mm and 80 mm. These tread separation layers are positioned radially at the bottom surface and radially on the outside at 3 mm from the radially outermost crown layer which, in this instance, is a protective layer. Each tread separation layer comprises reinforcing elements made of nylon, making, with the circumferential direction, an angle of 45°. The nylon used has a force at rupture of 15 daN.

In the case of the reference design, the mass of the pieces of tread is between 0.1 kg and 3.5 kg, whereas in the design according to the invention, the mass of the pieces of tread is between 0.1 kg and 0.8 kg.

The invention can be generalized to various types of tread separation layer, such as, non exhaustively, a tread separation layer of the woven fabric type or of the homogeneous sheet type or a superposition of tread separation layers.

In order to further control the maximum size of the tread pieces, it may be advantageous to create cavities in the edge corners of the circumferential ribs over a radial thickness at most equal to the radial height of the circumferential rib, the said cavities being circumferentially distributed at a spacing that needs to be optimized according to the target maximum circumferential length of the pieces of tread. These cavities constitute regions of preferential cutting of the tread in so far as they allow a local reduction in the radial thickness of the tread encouraging both a hinge effect as they pass through the contact area and the emergence of cracks spreading radially outwards from the tread separation layer.

The invention claimed is:
1. An aeroplane tire, comprising:
a tread adapted to come into contact with the ground via a tread surface and comprised radially between a bottom surface and the tread surface,
wherein the tread comprises at least two circumferential ribs adjacent to at least one circumferential groove, wherein each circumferential rib extends radially between the bottom surface and the tread surface and extends axially between two edge corners in the tread surface, a crown reinforcement radially on the inside of the bottom surface, a tread separation layer that is made up of a material comprising mutually parallel reinforcing elements and wherein an angle (i) formed by the reinforcing elements with the circumferential direction (XX') of the tire is at least equal to 30°, the tread separation layer being configured to limit crack progression and being arranged:

radially on the inside of at least one circumferential rib between the bottom surface and the crown reinforcement with a radial distance ($d_2$) between the tread separation layer and the crown reinforcement being at least equal to 2 mm to limit the progression of a crack formed in the at least one circumferential rib, axially between the two edge corners of the said circumferential rib in the tread surface to limit to the progression of a crack from one circumferential rib to another circumferential rib and wherein an axial distance (a) between each axial end of the tread separation layer and the edge corner of the circumferential rib that is closest is at least equal to 3 mm, and circumferentially over at least part of the circumference of the tire, and wherein a radial distance ($d_1$) between the tread separation layer and the bottom surface is at most equal to 1 mm.

2. The aeroplane tire according to claim 1, wherein the tread separation layer extends circumferentially over the entire circumference of the tire.

3. The aeroplane tire according to claim 1, wherein the angle (i) formed by the reinforcing elements of the tread separation layer with the circumferential direction (XX') of the tire is at least equal to 45°.

4. The aeroplane tire according to claim 1, wherein the reinforcing elements of the tread separation layer are made up of at least one textile material.

5. The aeroplane tire according to claim 1, wherein the reinforcing elements of the tread separation layer) are made up of at least one aliphatic polyamide.

6. The aeroplane tire according to claim 1, wherein the reinforcing elements of the tread separation layer are made up of nylon.

* * * * *